(12) United States Patent
Magis (10) Patent No.: US 8,615,650 B2
(45) Date of Patent: Dec. 24, 2013

(54) CONTROL-WORD DECIPHERING, TRANSMISSION AND RECEPTION METHODS, RECORDING MEDIUM AND SERVER FOR THESE METHODS

(75) Inventor: Erwann Magis, Paris (FR)

(73) Assignee: Viaccess, Paris (FR)

( * ) Notice: Subject to any disclaimer, the term of this patent is extended or adjusted under 35 U.S.C. 154(b) by 0 days.

(21) Appl. No.: 13/519,661

(22) PCT Filed: Dec. 20, 2010

(86) PCT No.: PCT/EP2010/070318
§ 371 (c)(1),
(2), (4) Date: Jun. 28, 2012

(87) PCT Pub. No.: WO2011/080150
PCT Pub. Date: Jul. 7, 2011

(65) Prior Publication Data
US 2012/0290831 A1 Nov. 15, 2012

(30) Foreign Application Priority Data
Dec. 28, 2009 (FR) ...................................... 09 59612

(51) Int. Cl.
*H04L 9/00* (2006.01)
(52) U.S. Cl.
USPC ............... 713/150; 713/182; 713/189; 726/2; 726/26; 726/27
(58) Field of Classification Search
USPC ................. 713/1, 2, 150, 164, 165, 182, 189; 726/22, 23, 24, 26, 2, 27
See application file for complete search history.

(56) References Cited

U.S. PATENT DOCUMENTS

| | | | |
|---|---|---|---|
| 5,719,941 A | 2/1998 | Swift et al. | |
| 7,466,826 B2 * | 12/2008 | Andreaux et al. | 380/277 |
| 7,900,041 B2 * | 3/2011 | Main et al. | 713/155 |
| 8,239,957 B2 * | 8/2012 | Belenky | 726/26 |
| 2004/0017918 A1 * | 1/2004 | Nicolas | 380/279 |
| 2004/0111740 A1 * | 6/2004 | Seok et al. | 725/31 |
| 2004/0168063 A1 * | 8/2004 | Revital et al. | 713/172 |

(Continued)

FOREIGN PATENT DOCUMENTS

| | | |
|---|---|---|
| EP | 1705915 | 9/2006 |
| FR | 2694860 | 8/1992 |

(Continued)

OTHER PUBLICATIONS

Francis, Lishoy, William G. Sirett, Keith Mayes, and Konstantinos Markantonakis. "Countermeasures for attacks on satellite tv cards using open receivers." In Conferences in Research and Practice in Information Technology Series, vol. 108, pp. 153-158. 2005.*

(Continued)

*Primary Examiner* — Saleh Najjar
*Assistant Examiner* — Joseph Pan
(74) *Attorney, Agent, or Firm* — Occhiuti & Rohlicek LLP (57) ABSTRACT

A method for deciphering control words for mechanically and electronically independent terminals includes causing first and second terminals to transmit a first and second cryptograms to a control-word server, causing that server to decipher them to obtain first and second control words for enabling descrambling of first and second multimedia content broadcast simultaneously on respective first and second channels, causing the server to transmit the control word to the respective terminals, the second control word obtained by deciphering the second cryptogram before the first terminal executes a channel change, and in response to the channel change, causing the first terminal to search to determine whether the second control word has already been transmitted in advance by the server before the channel change, and if the control word has been transmitted in advance, causing the first terminal to immediately start descrambling the second multimedia content with the second control word.

14 Claims, 3 Drawing Sheets

(56) References Cited

U.S. PATENT DOCUMENTS

| | | |
|---|---|---|
| 2006/0150211 A1* | 7/2006 | Ritter .............................. 725/31 |
| 2007/0124807 A1 | 5/2007 | Jau |
| 2009/0153747 A1* | 6/2009 | Grimes ........................ 348/731 |
| 2009/0183196 A1* | 7/2009 | Chen et al. ..................... 725/31 |

FOREIGN PATENT DOCUMENTS

| | | |
|---|---|---|
| WO | 2005/020564 | 3/2005 |
| WO | 2008/002312 | 1/2008 |
| WO | 2009/092016 | 4/2009 |

OTHER PUBLICATIONS

"Functional Model of Conditional Access System", EBU Review, Technical European Broadcasting Union, Brussels, BE, n° 266, Dec. 21, 1995.

Menezes, Vanstone, Oorschot: "Handbook of Applied Cryptography", 1997, CRC Press LLC, USA, XP002591810, p. 547-p. 555.

\* cited by examiner

CONTROL-WORD DECIPHERING, TRANSMISSION AND RECEPTION METHODS, RECORDING MEDIUM AND SERVER FOR THESE METHODS

CROSS-REFERENCE TO RELATED APPLICATIONS

This application is the National Stage of International Application No. PCT/EP2010/070318, filed Dec. 20, 2010, which claims the benefit of the priority date of French Patent Application No. 0959612 filed Dec. 28, 2009. The content of these applications is hereby incorporated by reference in its entirety.

FIELD OF THE INVENTION

The invention pertains to methods for enciphering, transmitting and receiving control words. The invention also pertains to an information-recording medium and to a control-word server to implement these methods.

BACKGROUND

There are methods for deciphering control words for a first terminal and at least one second terminal that are mechanically and electronically independent of one another, wherein:
  the first and second terminals respectively transmit cryptograms $CW^*_{1,t}$ and $CW^*_{2,t}$ to a same control-word server,
  in response the control-word server deciphers the cryptograms $CW^*_{1,t}$ and $CW^*_{2,t}$ to obtain respectively control words $CW_{1,t}$ and $CW_{2,t}$, the control words $CW_{1,t}$ and $CW_{2,t}$ enabling the descrambling, respectively, of first and second multimedia contents broadcast simultaneously on first and second channels respectively, and then,
  the control-word server transmits the control words $CW_{1,t}$ and $CW_{2,t}$, respectively to the first and second terminals.

The term "multimedia content" designates an audio and/or visual content designed to be rendered in a form directly perceptible and comprehensible to a human being. Typically, a multimedia content corresponds to a succession of images forming a film, a television show or advertising material. A multimedia content can also be an interactive content such as a game.

There are known ways of broadcasting several multimedia contents at the same time. To this end, each item of multimedia content is broadcast on its own channel. The channel used to transmit a multimedia content is also known as a "station". A channel typically corresponds to a television station. This enables the user to choose simply the multimedia content that he wishes to view in changing channels.

To secure and subject the viewing of multimedia contents to certain conditions, such as the payment of a subscription for example, the multimedia contents are broadcast in scrambled form and not in plain or unencrypted form. More specifically, each multimedia content is divided into a sequence of cryptoperiods. Throughout the duration of a cryptoperiod, the conditions of access to the scrambled multimedia content remain unchanged. In particular, throughout the duration of a cryptoperiod, the multimedia content is scrambled with the same control word. Generally, the control word varies from one cryptoperiod to another. Furthermore, the control ward is generally specific to a multimedia content. Thus if, at a given instant, N multimedia contents are broadcast simultaneously on N channels, then there are N different control words each used to scramble one of these multimedia contents.

Here, the terms "scramble" and "encipher" are considered to be synonyms.

The plain or unencrypted multimedia content corresponds to the multimedia content before it is scrambled. This content can be made directly comprehensible to a human being without recourse to descrambling operations and without placing conditions on the viewing of this content.

The control words needed to descramble the multimedia contents are transmitted synchronizedly with the multimedia contents. For example, the control words needed to descramble the $(t+1)^{th}$ cryptoperiod are received by each terminal during the $t^{th}$ cryptoperiod. To this end, for example, the control words are multiplexed with the scrambled multimedia content.

To secure the transmission of the control words, these words are transmitted to the terminals in the form of cryptograms. The term "cryptogram" herein designates a piece of information that is not sufficient by itself to retrieve the control word in plain form. Thus, if the transmission of the control word is intercepted, knowledge of the control word cryptogram alone does not make it possible to retrieve the control word by which the multimedia content can be descrambled. To retrieve the plain control word, i.e. the control word used to directly descramble the multimedia content, it must be combined with a piece of secret information. For example, the cryptogram of the control word is obtained by enciphering the plain control word with a cryptographic key. In this case, the secret information is the cryptographic key used to decipher this cryptogram. The cryptogram of the control word can also be a reference to a control word stored in a table containing a multitude of possible control words. In this case, the secret information is the table associating a plain control word with each reference.

The secret information should be kept in a secure place. To this end, it has already been proposed to store the secret information:
  either in security processors such as hip cards directly connected to each of the terminals,
  or more recently in control-word servers common to several terminals.

In the latter case, the terminals are devoid of chip cards. These terminals are then called cardless terminals.

The control-word server is connected to each of the terminals by a long-distance information-transmission network such as the Internet. When a control-word server is used, the cryptograms of the control words are first of all transmitted to the different terminals and then forwarded by these terminals to the control-word server. This procedure has several advantages. In particular, the information-transmission network used to broadcast the multimedia contents and the cryptograms of the control words can be different from the one used to connect the terminals to the control-word server. For example, the network for broadcasting multimedia content and cryptograms of the control words is a one-way network with a large bandwidth, for example a satellite network. Conversely, the network connecting the terminals to the control-word server is a two-way network with a bandwidth that may be smaller.

Then, this simplifies the time synchronization between the broadcasting of the multimedia contents and the broadcasting of the cryptograms of the corresponding control words.

The control-word server has the function of deciphering the cryptograms of the control words transmitted by the terminals and then sending the deciphered control word back to each of these terminals. Thus, in a way, the control-word server plays the role of a chip card common to several terminals that are mechanically and electrically independent of one another. Terminals that are electronically independent of one another are terminals that can work autonomously and have no electronic part common to them, When a terminal needs a control word to descramble a multimedia content, it sends the control-word server a request containing the cryptogram of the control word. In response, the control-word server deciphers this cryptogram and then sends the deciphered control word to the terminal which can then descramble the desired multimedia content.

The multimedia contents broadcast over the different channels are temporally coordinated with one another. For example, the multimedia content broadcasting times are set so as to comply with the broadcasting times indicated in a pre-established program schedule. Each terminal on a given channel therefore receives appreciably the same multimedia content at the same time.

Thus, it often happens that users change channels (or stations) at the same time. For example, a simultaneous change of channel of this kind can be prompted by the broadcasting of an advertising sequence on the channel being currently viewed. The user is then said to have "zapped channels".

In response to this change of channel, each terminal immediately transmits a request to the control-word server and, in response, receives the control word needed to descramble of the multimedia content currently being broadcast on the new channel being viewed. Thus, a massive and simultaneous change from one channel to another will cause a peak in the workload of the control-word server.

The computation power of the control-word server depends on this load peak. Thus, the greater the load peak, i.e. the greater the maximum number of requests to be processed in a predetermined time span, the greater is the computation power needed by the control-word server.

These workload peaks should be reduced as far as possible in order to limit the computation power needed by the control-word server while at the same limiting modifications made to the scrambled multimedia content transmission system.

SUMMARY OF THE INVENTION

The invention seeks to limit these load peaks of the control-word server. An object of the invention therefore, is a method for deciphering control words wherein.

the control-word server transmits, also to the first terminal, the control word $CW_{2,t}$ obtained by deciphering the cryptogram $CW^*_{2,t}$ transmitted by the second terminal even before the first terminal changes descrambled channels in passing from the first channel to the second channel, and in response to the change in channel, the first terminal first seeks to find out if the control word $CW_{2,t}$ has already been transmitted in advance by the control-word server even before the change in channel and, if the answer is yes, the first terminal immediately starts descrambling the multimedia content broadcast on this second channel with the control word $CW_{2,t}$ transmitted in advance.

Through the above method, the first terminal has advance possession of the control word $CW_{2,t}$ needed to descramble the multimedia contents simultaneously broadcast on the second channel. Thus, if the user switches from the first channel to the second channel, it is not necessary for the first terminal to immediately transmit a request to the control-word server to be given the control word $CW_{2,t}$. The load peaks of the control-word server are therefore reduced by preventing the systematic and immediate transmission of a large number of simultaneous requests to this control-word server in response to a channel change.

To implement this method, the first terminal does not need to transmit the cryptogram $CW^*_{2,t}$ to the control-word server before the change in channel. This method is therefore simple to implement and minimizes the modifications to be made to the terminal This method also reduces the waiting time before the multimedia content broadcast on the second channel can be descrambled. Indeed, the terminal does not have to immediately send a request to the control-word server and then wait for the control word $CW_{2,t}$ if it has already been transmitted in advance.

An object of the invention is also a method for transmitting control words $CW_{1,t}$ and $CW_{2,t}$ to first and second terminals that are mechanically and electronically independent of one another, wherein:

in response to the transmission of cryptograms $CW^*_{1,t}$ and $CW^*_{2,t}$ by the first and second terminals respectively, the same control-word server deciphers the cryptograms $CW^*_{1,t}$ and $CW^*_{2,t}$ to obtain respectively control words $CW_{1,t}$ and $CW_{2,t}$, enabling the descrambling, respectively, of the first and second multimedia contents broadcast simultaneously on the first and second channels respectively, and then the control word server transmits the control words $CW_{1,t}$ and $CW_{2,t}$, respectively to the first and second terminals, and the control-word server transmits, also to the first terminal, the control word $CW_{2,t}$ obtained by deciphering the cryptogram $CW^*_{2,t}$ transmitted by the second terminal even before the first terminal changes descrambled channels in passing from the first to the second channel.

The embodiments of the transmission method may comprise one or more of the following characteristics:

in response to the transmission of a cryptogram $CW^*_{3,t}$ to the same control-word server by a third terminal that is mechanically and electronically independent of the first and second terminals, the control-word server deciphers the cryptogram $CW^*_{3,t}$ for each control word $CW_{3,t}$ to enable the descrambling of a third multimedia content broadcast on a third channel simultaneously with the first and second multimedia contents and then the control-word server selects the control word $CW_{2,t}$ from a table containing at least the control words $CW_{2,t}$, and $CW_{3,t}$, and does not select the control word $CW_{3,t}$, and then transmits only the control word selected from this table at the first terminal;

the control-word server:

builds an index; for each channel associated with control words contained in the table, this index representing the probability that the channel will soon be descrambled by the first terminal, and selects, from the table, the control word or words to be transmitted to the first terminal as a function of this index;

the index of the second channel is built from a counting of the number of transmissions of the cryptogram $CW^*_{2,t}$ by other terminals that are mechanically and electronically independent of the second terminal;

the control-word server transmits each control word associated with an identifier of the cryptoperiod or cryptoperiods that this control word serves to descramble.

These embodiments of the method of transmission furthermore have the following advantages:

transmitting only a part of the control words deciphered by the control-word server to the first terminal restricts the bandwidth used by this control-word server and this first terminal, using an index representing the probability that a control word will be used by the first terminal in the event of a channel change provides for enhanced smoothing of the load peaks of the control-word server because it increases the probability of advance transmission of the control word which will become necessary in the event of a channel change;

building this index on the basis of the counting of the number of cryptograms $CW^*_{2,t}$ transmitted by the other terminals refines the index and therefore restricts the probability of occurrence of a load peak of the control-word server;

should the control words be sent in pairs (ECW or even-parity control word and OCW or odd-parity control word), then the use of a cryptoperiod identifier averts the need to ask for a new pair of control words if at least one of the control words of a pair memorized in the terminal can be used to descramble the desired multimedia content.

An abject of the invention is also a method for the reception of control words $CW_{1,t}$ and $CW_{2,t}$ by a first terminal wherein:

the first terminal sends a cryptogram $CW^*_{1,t}$ to a control-word server and receives in response a control word $CW_{1,t}$ deciphered by this control-word server, this control word $CW_{1,t}$ being used to descramble a multimedia content broadcast on a first channel received by the first terminal, the first terminal also receives the control word $CW_{2,t}$ to descramble another multimedia content simultaneously broadcast on a second channel, it being possible for this control word $CW_{2,t}$ to be obtained solely by the deciphering of a cryptogram $CW^*_{2,t}$ by the control-word server, the first terminal changes descrambled channels by passing from the first channel to the second channel.

In this method of reception:

the first terminal receives the control word $CW_{2,t}$ even before the first terminal has changed channels without ever having preliminarily transmitted the cryptogram $CW^*_{2,t}$ to the control-word server, and in response to the channel change, the first terminal first of all makes a search to see if the control word $CW_{2,t}$ has already been transmitted in advance by the control-word server even before the change in channel and, if the answer is yes, the first terminal immediately starts descrambling the multimedia content broadcast on this second channel with the control word $CW_{2,t}$ transmitted in advance.

The embodiments of this reception method may comprise one or more of the following characteristics:

the first terminal descrambles a $t^h$ cryptoperiod of the multimedia content broadcast on this first channel with the control word $CW_{1,t}$ and delays the transmission of a cryptogram $CW^*_{1,t+1}$, to descramble the $(t+1)^{th}$ cryptoperiod of the multimedia content broadcast on this same channel by a determined period of time to spread out, at least throughout the duration of the $t^h$ cryptoperiod, the instants of transmission of the cryptograms $CW^*_{1,t+1}$ coming from different terminals that are mechanically and electrically independent of one another;

If the control word $CW_{2,t}$ has not been transmitted before the first terminal changes channels, the first terminal immediately transmits the cryptogram $CW^*_{2,t}$ to the server of control words and then waits until it has received the control word $CW_{2,t}$ transmitted by the control-word servers before starting to descramble the multimedia content broadcast on the second channel:

the first terminal stores only the control word $CW_{2,t}$ in the form of a cryptogram $E_{K1}(CW_{2,t})$ obtained by enciphering the control word $CW_{2,t}$ with a secret key K1, the key K1 being known only to the first terminal and being unknown to the other terminals.

These embodiments of the reception method furthermore have the following advantages:

delaying the transmission of a cryptogram needed to descramble a following cryptoperiod of a multimedia content broadcast on the same channel lightens the workload of the control-word server; and storing only the cryptogram $E_{K1}(CW_{2,t})$ in the terminal increases the security.

An object of the invention is also an information-recording medium comprising instructions to implement one of the above methods, when these instructions are executed by an electronic computer.

Finally, an object of the invention is the control-word server, this server being capable:

in reponse to the transmission of cryptograms $CW^*_{1,t}$ and $CW^*_{2,t}$ by the first and second terminals respectively, of deciphering the cryptograms $CW^*_{1,t}$ and $CW^*_{2,t}$ to obtain respectively control words $CW_{1,t}$ and $CW_{2,t}$, the control words $CW_{1,t}$ and $CW_{2,t}$ enabling the descrambling, respectively, of the first and second multimedia contents broadcast simultaneously on the first and second channels respectively, and then transmitting the control words $CW_{1,t}$ and $CW_{2,t}$, respectively to the first and second terminals, and transmitting, to the first terminal, the control word $CW_{2,t}$ obtained by deciphering the cryptogram $CW^*_{2,t}$ transmitted by the second terminal even before the first terminal changes descrambled channels in passing from the first to the second channel.

BRIEF DESCRIPTION OF THE DRAWINGS

The invention will be understood more clearly from the following description, given purely by way of a non-restrictive example and made with reference to the appended drawings, of which.

In these figures, the same references are used to designate the same elements.

DETAILED DESCRIPTION OF THE INVENTION

Here below in this description, the characteristics and functions well known to those skilled in the art shall not be described in detail. Furthermore, the terminology used is that of systems of conditional access to multimedia contents. For further information on this terminology, the reader may refer to the following document:

"Functional Model of Conditional Access System", EBU Review, Technical European Broadcasting Union, Brussels, BE, n° 266, 21 Dec. 1995.

Figure 1:
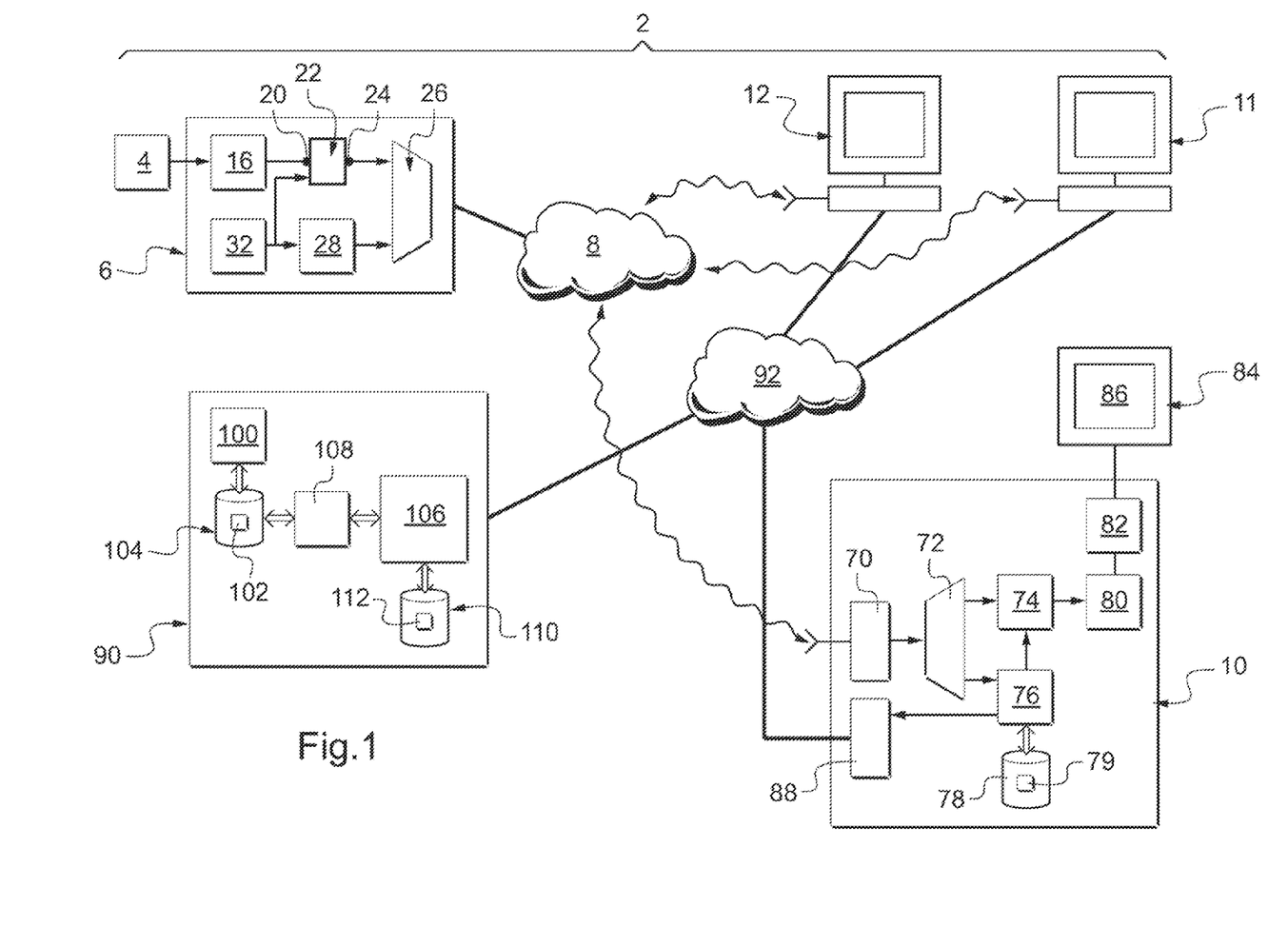
FIG. 1 is a schematic illustration of a system for broadcasting scrambled multimedia contents.

FIG. 1 represents a system 2 for sending and receiving multimedia contents. A multimedia content corresponds for example to a sequence of an audio/visual program such as a television broadcast or a film.

Plain multimedia contents are generated by one or more sources 4 and transmitted to a device 6 for simultaneous broadcasting to a multitude of reception devices through an information-transmission network 8. The multimedia contents broadcast are time-synchronized with one another so as for example to comply with a pre-established program schedule.

The network 8 is typically a long-distance information-transmission network such as the Internet or a satellite network or any other broadcasting network such as the one used to transmit digital terrestrial television (DTTV).

To simplify FIG. 1, only three reception devices 10 to 12 are shown.

The device 6 includes an encoder 16 which compresses the multimedia contents that it receives. The encoder 16 processes digital multimedia contents. For example, this encoder works in compliance with the MPEG2 (Moving Picture Expert Group-2) standard or the UIT-T H264, The compressed multimedia contents are directed towards an input 20 of a scrambler 22. The scrambler 22 scrambles each compressed multimedia content to make its viewing conditional on certain terms such as the purchase of an access entitlement by the users of the reception devices. The scrambled multimedia contents are rendered at an output 24 connected to the input of a multiplexer 26.

The scrambler 22 scrambles each compressed multimedia content by means of a control word $CW_{i,t}$ that is given to it as well as to a conditional access system 28 or CAS by a key generator 32. The index i is an identifier of the channel on which the scrambled multimedia content is broadcast and the index t is an identifier of the cryptoperiod scrambled with this control word.

Typically, this scrambling is compliant with a standard such as the DVB-CSA (Digital Video Broadcasting—Common Scrambling Algorithm), ISMA Cryp (Internet Streaming Media Alliance Cryp), IPsec (Internet Protocol Security Keying Information Resource Record Working Group), SRTP (Secure Real-time Transport Protocol), or other such standards.

The system 28 generates ECM (Entitlement Control Messages) containing at least the cryptogram $CW^*_{i,t}$ of the control word $CW_{i,t}$ generated by the generator 32 and used by the scrambler 22 for each cryptoperiod of each multimedia content. These messages and the scrambled multimedia contents are multiplexed by the multiplexer 26, these scrambled multimedia contents being respectively given by the conditional access system 28 and the scrambler 22 and then transmitted on the network 8.

The system 28 also inserts the following in each ECM:
the identifier i of the channel,
an instant $t_{diff}$ of the first broadcast of the ECM by the device 6, and
access rights DA to be compared with access entitlements acquired by the user.

The same identifier is inserted in all the ECM messages containing a cryptogram $CW^*_{i,t}$ for the descrambling of the multimedia content broadcast on a same channel.

By way of an illustration here, the scrambling and the multiplexing of the multimedia content here is compliant with the DVB-Simulcrypt protocol. In this case, the identifier i may correspond to a unique "channel ID/stream ID" pair on which are sent all the requests for the generation of ECM messages for this channel.

For example, the terminals 10 to 12 are identical and only the terminal 10 is described in greater detail.

The reception device 10 includes a receiver 70 of broadcast multimedia contents. This receiver 70 is connected to the input of a demultiplexer 72 which transmits on the one hand the multimedia content to a descrambler 74 and on the other hand the ECM and EMM (Entitlement Management Message) messages to a processor 76. The processor 76 processes confidential information such as cryptographic keys. In order that the confidentiality of this information may be preserved, it is designed to be as robust as possible against attempted attacks by computer hackers. It is therefore more robust against these attacks than the other components of the device 10. This robustness is obtained for example by implementing a software module dedicated to the protection of secret information.

The processor 76 is made for example by means of programmable electronic computers capable of executing instructions recorded on an information-recording medium. To this end, the processor 76 is connected to a memory 78 containing the instructions needed to execute the methods of FIG. 3 or 4.

The memory 78 also contains:
a cryptographic certificate to authenticate the terminal 10, and
a local table 79 of control words.

The descrambler 74 descrambles the scrambled multimedia content using the control word transmitted by the processor 76. The descrambled multimedia content is transmitted to a decoder 80 which decodes it. The decompressed or decoded multimedia content is transmitted to a graphic card 82 which drives the display of this multimedia content on a display unit 84 equipped with a screen 86.

The display unit 84 provides a plain display of the multimedia content on the screen 86, The terminal 10 also has a sender 88 used to set up a secured connection with a network tunnel endpoint 90 by means of an information-transmission network 92. For example, the network 92 is a long-distance information-transmission network and more specifically a packet-switching network such as the Internet. The secured connection is for example a secured tunnel The network tunnel endpoint 90 has a module 100 for managing the access entitlements of the different users of the system 2. This module 100 is better known as a "subscriber authorization system" This module 100 generates a database 102 and keeps it up to date. With each user identifier, the database 102 associates the access entitlements acquired by this user. This database 102 is stored in a memory 104.

The tunnel end point 90 also has a server 1038 of control words connected to an access-right checking module 108 and a memory 110 containing a table 112 of control words. Typically, the server 106 is made out of programmable electronic computers capable of executing instructions recorded in an information-recording medium. To this end, the memory 110 also has instructions to execute the method of FIG. 3 or 4.

Figure 2:
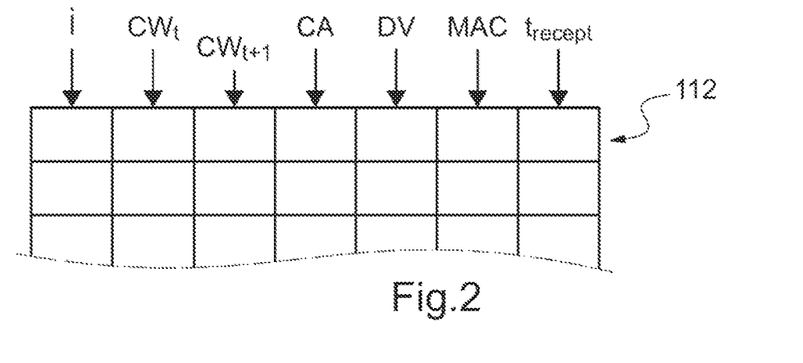
FIG. 2 is a schematic illustration of a control word table used in the system of FIG. 1.

An example of a structure of the table 112 is shown in greater detail in FIG. 2. Each row of the table 112 corresponds to a recording. The table 112 has several recordings. Each recording corresponds to an ECM message. Each of these recordings contains the following fields:

a field i containing the identifier of the broadcast channel, a field $CW_t$ containing the control word $CW_{i,t}$ used to scramble the cryptoperiod t of the multimedia content broadcast on the channel i, a field $CW_{t+1}$ containing the control word $CW_{i,t+1}$ used to scramble the cryptoperiod t+1 immediately following the multimedia content broadcast on the channel a field CA containing the conditions of access to the multimedia content, a field DV containing the duration of validity of the control words $CW_{i,t}$ and $CW_{i,t+1}$, a field MAC containing information to check the integrity of the ECM message received, and a field $t_{recept}$ containing the instant of reception of the ECM message used to obtain the pair of control words $CW_{i,t}/CW_{i,t+1}$.

The structure of the table 79 is for example identical to the structure of the table 112.

The working of the system 2 shall now be described in greater detail with reference to the method described in FIG. 3.

Initially, at a step 120, the device 6 broadcasts several different multimedia contents simultaneously on different channels. On each channel, the cryptoperiod t and the next cryptoperiod t+1 are scrambled with the control words, $CW_{i,t}$ and $CW_{i,t+1}$. The ECM messages containing the cryptograms $CW^*_{i,t}$ and $CW_{i,t+1}$ of the control words $CW_{i,t}$ and $CW_{i,t+1}$ are multiplexed with the broadcast multimedia contents. This multiplexing synchronizes the broadcasting of the control words with the broadcasting of the multimedia contents. Typically, the ECM messages are repeated several times within a same cryptoperiod. For example, the ECM messages are repeated every 0.1 second to 0.5 seconds. The duration of a cryptoperiod is greater than 10 seconds and preferably greater than 5 or 10 minutes in order to further limit pressure on the control-word servers.

The scrambled multimedia contents are received appreciably at the same time by each of the terminals 10 to 12. The following steps are therefore executed appreciably in parallel for each of these terminals. It is also assumed that the different terminals simultaneously descramble a multimedia content each, broadcast on a respective channel. The next steps are described in the particular case of the terminal 10.

At a step 122, the scrambled multimedia contents with ECM messages are received by the receiver 70.

Then, at a step 124, the demultiplexer 72 extracts the scrambled multimedia content corresponding to the channel i for which the descrambling is currently being requested by the user. At the step 124, the demultiplexer 72 also extracts solely the ECM messages containing the cryptograms of the control words to descramble this same channel. The demultiplexer 72 transmits the extracted multimedia content to the descrambler 74. The extracted ECM messages for their part are transmitted to the processor 76.

At a step 126, the processor 76:

searches to see if the MAC signature of the transmitted ECM already present in its local table 79, and ascertains by means of the duration of validity DV that the control words associated with this signature are valid.

If the control words found in the table 79 are valid, then the terminal proceeds to a phase 127 for descrambling the multimedia content broadcast on the channel i.

More specifically, at a step 128, the processor 76 sends the descrambler 74 the control words $CW_{i,t}$ and $CW_{i,t+1}$ associated with this MAC signature in the table 79. No request to decipher the cryptograms $CW^*_{i,t}$ and $CW^*_{i,t+1}$ is immediately transmitted to the server 106.

In response, the descrambler at a step 130, descrambles the multimedia content received through this pair of control words $CW_{i,t}/CW_{i,t+1}$.

At a step 132, the descrambled multimedia content is decoded by the decoder 80 and then transmitted to the video card 82.

Finally, at a step 134, the video card 82 transmits the video signal to the display device 84 so that the multimedia content gets displayed on the screen 86 in a way that is directly perceptible and comprehensible to a human being.

If the MAC signature is not in the table 79 or if the associated control words have expired, then the processor 76 performs a step 138 during which it checks to see if the user has changed channels. For example, it compares the channel identifier contained in the received ECM received with the channel identifier contained in the previous received ECM message.

If the answer is yes then, at a step 140, the terminal 10 immediately sends a request to the server 106 to decipher the cryptograms $CW^*_{i,t}$ and $CW^*_{i,t+1}$ contained in the ECM message received. This request contains the ECM message received and therefore the pair of cryptograms $CW^*_{i,t}/CW^*_{i,t+1}$ as well as an identifier of the user of the terminal that has sent the request. This request is transmitted to the server 106 through the sender 88 and the network 92. All these exchanges of information between the terminal and the server 106 are done by means of a secured tunnel set up through the network 92. The setting up of the tunnel calls for the authentication and identification of the terminal by the server 106, for example using the cryptographic certificate contained in the memory 78.

If the answer is negative, then at a step 142, the processor 76 delays the transmission of this request. To this end, the processor 76 determines a period of waiting before activating the sending of the request to the server 106. This waiting period is determined so as to smoothen the instants at which these requests are sent by different terminals having received this new ECM message at the same time. The waiting time is however chosen systematically to be short enough to enable the reception of the pair of control words $CW_{i,t}/CW_{i,t+2}$ deciphered before the end of the cryptoperiod t. For example, at the step 142, the processor 76 randomly or pseudo-randomly draws a number and, depending on this random number, determines the duration of the waiting to be applied. After the waiting duration, the result is sent to the server 106.

This temporal smoothing of the instants at which the request is sent to the server 106 by different terminals using the same control-word server limits the appearance of load peaks. In particular, this prevents a situation of having a load peak in response to each first broadcast of a new ECM.

At a phase 144, the server 106 responds as quickly as possible to the request sent at the end of the step 140 or 142.

For example, in response to the reception of such a request at a step 146, the server 106 selects recordings in the table 112 to build a new local table for this terminal. To this end, the module 108 extracts, from the base 102, the access entitlements corresponding to the user identifier contained in the request. Then, the server 106 selects, in the table 112, only the control words associated with access rights DA corresponding to access to the extracted access entitlements. Then, this local table is limited to the N pairs of control words corresponding to the N channels to which it is most probable that the user will be zapping, where N is an integer greater than 1 and preferably greater than 2 or 10. To this end, the server 106 builds and uses indices $P_i$ associated with each channel i. These indices P, represent the probability that the user will change to the channel i. By way of an illustration, here, the index P, is the value of a counter $C_i$. For each channel i, a counter $C_i$ counts the number of times when a request to decipher a pair of control words $CW_{i,t}/CW_{i,t+1}$ has been received by the server 106 during a sliding window. Typically, the duration $S_1$ of the sliding window is greater than at least one cryptoperiod and preferably greater than several cryptoperiods. For example, the duration $S_1$ ranges from 30 seconds to five minutes. The counter $C_i$ is incremented by a step whatever the terminal that has sent a request to obtain a control word enabling the channel to be descrambled. The value of the counter $C_i$ is therefore equal to the number of times in which, during the period $S_1$ the server 106 has received a request to decipher a control word necessary for the descrambling of this channel. Thus, the value of the counter $C_i$ is all the greater as the number of terminals descrambling the channel i is great. The value of the counter $C_i$ therefore indicates the channels that are most requested by the users. In this embodiment, it is considered that the more the channel i is in demand, the more probable it is that a channel will change its current channel to descramble the channel i. For example, the counter C, is stored in the memory 110.

Then, at a step 148, the server 106 makes a check to see if the ECM contained in the request of the terminal 10 has already been received. For example, to this end, it compares the MAC signature of the ECM received with the MAC signatures contained in the table 112.

If the MAC signature is not already in the table 112, it means that this ECM is received for the first time by the server 106. The server 106 then carries out a phase 150 of updating the table 112. This phase starts with a step 150 during which the server 106 deciphers the pair of cryptograms $CW^*_{i,t}/CW^*_{i,t+1}$ contained in the ECM received. At the step 152, the server 106 also computes a duration of validity DV for the control words thus deciphered. For example, this duration of validity is computed by means of the following formula:

$$DV = t_{diff} + 2 \times CP - t_{proc}$$

where
- $t_{diff}$ is the instant of the first broadcast of the ECM by the device 6, this instant being contained in the ECM received,
- CP is the known duration of a cryptoperiod, and
- $t_{proc}$ is a predetermined value corresponding appreciably to the time of transmission of an ECM message from the device 6 to the server 106 and for the processing of this message by the server 106 and the terminal.

Then, the server 106 adds a new recording in the table 112. This new recording contains:
- the identifier i of the channel contained in the ECM,
- the new pair of control words $CW_t/CW_{t+1}$,
- the access rights DA,
- the MAC signature of the received ECM,
- the computed duration of validity DV, and
- the instant $t_{recept}$ of reception of the ECM by the server 106.

The phase 150 also comprises a step 154 for managing the sliding window during which the server checks to see if the difference between the current instant $t_c$ and the reception instant $t_{recept}$ of a recording in the table 112 does not exceed the duration $S_1$. If the answer is yes, the corresponding recording is erased from the table 112. At the same time, the counter $C_i$ associated with the identifier of the erased recording is decremented by one step. Should the threshold $S_1$ not be crossed, the recording is not erased and remains contained in the table 112.

The step 115 is reiterated at regular intervals so as to erase those recordings from the table 112 that have become obsolete.

If the ECM message contained in the request is already in the table 112, or at the end of the step 152, the server 106 performs a step 160 during which it increments the counter $C_i$ associated with the identifier i contained in the processed ECM.

At a step 162, the server 106 checks to see if the access rights contained in the received ECM message correspond to the access entitlements of the user who has transmitted this ECM message. If the answer is yes, and if the local table of the control words built during the step 146 does not already contain the pair $CW_{i,t}/CW_{i,t+1}$, the recording created from the received ECM is added to this local table.

If not, no recording containing the pair $CW_{i,t}/CW_{i,t+1}$ is added to the local table.

Finally, the server 106 sends the terminal 10, in response to its request, the local table built by the server 106. This new local table received by the terminal then replaces the table 79 previously used by the terminal 10.

Through this method, when a large number of users change channels at the same time, the probability that the control word needed to descramble the new channel is already contained in the table 70 is great. This makes it possible to limit the load peaks of the server 106 following simultaneous channel-changing by a large number of users.

It will be noted however, that if the local table 79 contains the pair $CW_{i,t}/CW_{i,t+1}$ for the channel and the change in channel occurs during the cryptoperiod t+1, then the terminal immediately sends a request to the server 106 to obtain the pair $CW_{i,t+1}/CW_{i,t+2}$. Indeed, the MAC signature of the ECM message containing the pair $CW_{i,t+1}/CW_{i,t+2}$ is not the same as that of the ECM message containing the pair $CW_{i,t}/CW_{i,t+1}$. It may be desirable to have available a method similar to that of FIG. 3 but enabling the terminal to exploit the control word $CW_{i,t+1}$ contained in the local table 79 to start immediately descrambling the multimedia content broadcast on the channel i without having to immediately send a request to the server 106.

Figure 4:
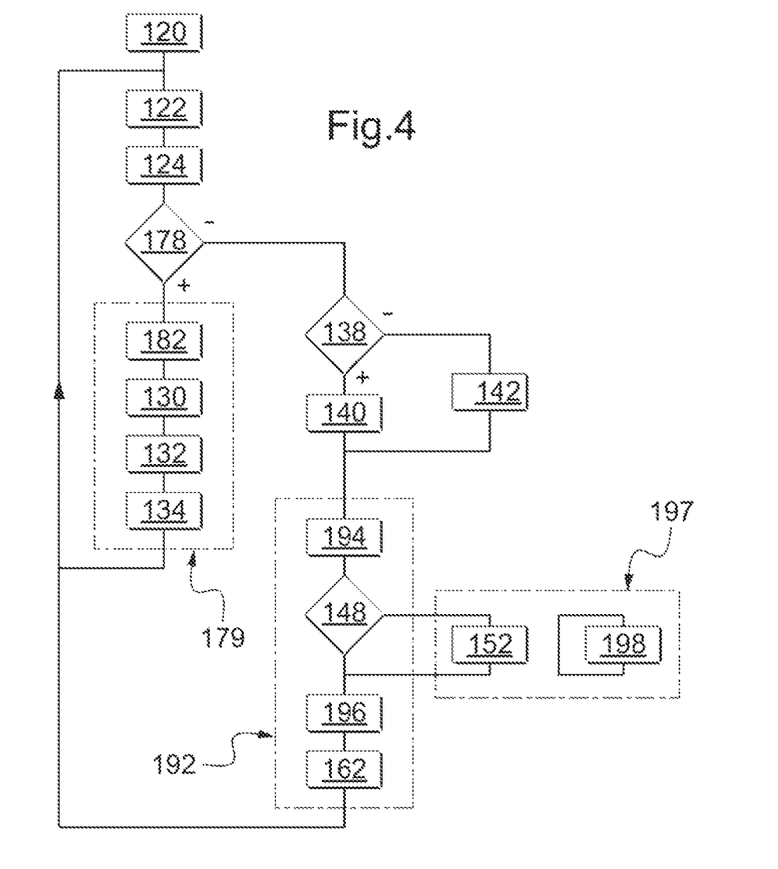
FIG. 4 is a flowchart of another method for transmitting scrambled multimedia contents by means of the system of FIG. 1.

The method of FIG. 4 furthermore makes it possible to comply with this requirement. To this end, an order number $N_{ECMi}$ is inserted in each message $ECM_{i,t}$ to identify the message $ECM_{i,t}$ preceding the message $ECM_{i,t+1}$. The number $N_{ECMi}$ is inserted into each ECM message by the device 6.

Figure 5:
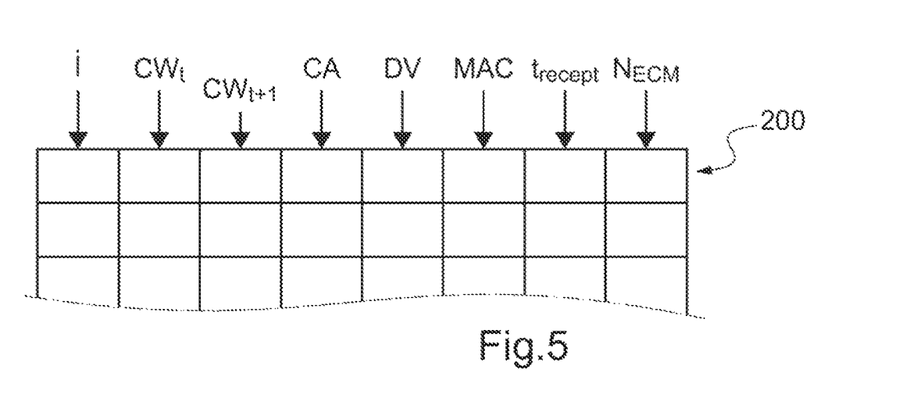
FIG. 5 is a schematic illustration of another embodiment of a table of control words used in combination with the method of FIG. 4.

To implement the method of FIG. 4, the structure of the tables 79 and 112 is modified to correspond to that of the table 200 (FIG. 5). The table 200 is identical to the table 112 except for the fact that, for each recording, it has an additional field $N_{ECMi}$ corresponding to the order number of the ECM message associated with a particular channel i.

Furthermore, in the method of FIG. 4, the selection of the control word is modified to take account solely of the past behavior of the user who has sent the request to the server 106. To this end, each counter $C_i$ is replaced by counters $C_{ij}$, where the index i is an identifier of the channel and the index j is an identifier of the user of the terminal. Each counter $C_{ij}$ counts the number of times where the user j has sent a request to descramble the channel during the sliding window of a duration $S_1$. This counter is therefore not modified by the information contained in requests coming from other terminals than that used by the user j. The value of each of these counters $C_{ij}$ is therefore an index $P_{ij}$ representing the probability that the user changes channels to pass to this channel i. The selection of the control words incorporated into the local table built by the server 106 for this user j is done as a function of the index $P_{ij}$. This adapts the building of the local table for the user j according to his past behavior.

Figure 3:
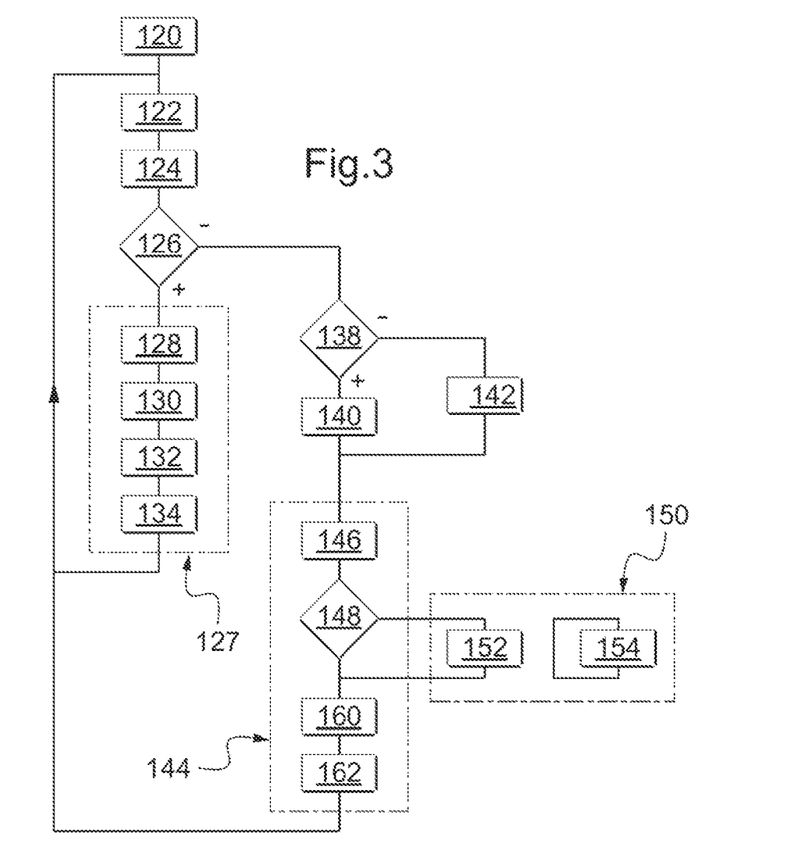
FIG. 3 is a flowchart of a method for transmitting scrambled multimedia contents by means of the system of FIG. 1.

The method of FIG. 4 is identical to the method of FIG. 3 except that the step 126 and the phases 127 and 144 are replaced respectively by the step 178 and the phases 179 and 192.

At the step 178, the processor 76 checks to see whether a valid control word required to descramble the broadcast multimedia content is already present in the table 79. To this end, the duration of validity DV associated with the identifier i in the table 79 is compared with the current instant $t_c$. Furthermore, the processor 76 also checks to see whether the order number $N_{ECMi}$ contained in the ECM message received is equal to the order number $N_{ECMi}$ associated with the identifier i in the table 79 or with the previous order number.

If the answer is yes, the processor 76 proceeds to the phase 179 for descrambling the multimedia content broadcast on the channel 1. This phase 179 is identical to the phase 127 except that the step 128 is replaced by a step 182. This step 182 is identical to the step 128 but in addition to the operations described here above, the processor 76 sends the descrambler 74 the pair of control words $CW_{i,t+1}/CW_{i,t}$ if the order number $N_{ECMi}$ contained in the table 79 is equal to the received order number $N_{ECMi}-1$.

Thus, even in response to the change in channel during the cryptoperiod t+1, the reception of an ECM message containing the cryptograms $CW^*_{i,t}/CW^*_{i,t+1}$ does not trigger the immediate sending of a new request to the server 106. On the contrary, this request is delayed so as to smooth the transmission of these requests to the server 106 to prevent load peaks.

The phase 192 is identical to the phase 144 except that the steps 146, 160 and 162 are replaced by steps 194, 196 and 198.

The step 194 is identical to the step 146 except that it is only the indices $P_{ij}$ associated with the user j that are used to select the recordings to be included in the local table built by the server 106.

The step 196 is identical to the 160 except that only the counter $C_{ij}$ specific to the user j and to the channel i is incremented whenever a new request to descramble this channel is received by the server 106.

The phase 150 is also replaced by a phase 197 identical to the phase 150 except that this phase 154 is replaced by another step 198 for managing the sliding window. At the step 198, all the counters $C_{ij}$ associated with the channel i of the erased recording are decremented at the same time. Consequently, the duration $S_1$ can be far greater than in the case of the method of FIG. 3. For example, the duration $S_1$ ranges from one to four weeks.

The method of FIG. 4 has several advantages. In particular, it can be used to descramble a new channel without immediately transmitting a new request to the server 106 provided that one of the two control words of a pair of control words can validly be used to descramble this channel.

Then, the use of the indices $P_{ij}$ increases the probability that, during a change in channel, the control word needed is already contained in the table 79. This therefore further limits the load peaks.

Many other embodiments are possible. In particular, there are many other existing possibilities for selecting the recordings of the table 112 used to build the table 79. In a first variant, the local table of control words is built by combining the teachings given with reference to FIGS. 3 and 4. For example, the local table is built by the server 106 by selecting recordings as a function of both the indices P and P.

In another variant, at least some of the recordings to be selected are identified manually by the user of the terminal 10. For example, during an initialization phase, the user of the terminal 10 interacts with the terminal to acquire a list of channel identifiers between which the user wishes to navigate rapidly. This list is transmitted to the server 106 which records it. Then, whenever an ECM message is transmitted by this terminal, the recordings corresponding to the channels referenced in the list are systematically incorporated into the local table of control words built by the server 106.

Indices of probabilities other than those described here above can be used to select the recordings to be incorporated into the local table. For example, the index can also depend on the initial channel descrambled before the channel is changed.

In a very simplified embodiment, the set of control words contained in the table 112 and corresponding to the access entitlements of the user are sent to the terminal in response to each request from this terminal. Thus, the different counters or indices enabling the selection of a limited number of recordings among all the recordings contained in the table 112 are omitted.

The channel identifier incorporated into the ECM message can be generated by the terminal itself and incorporated solely into the request transmitted to the control-word server. In this case, it is not necessary for this channel identifier to be incorporated into the ECM messages built by the system 28.

The updating of the table 79 is not necessarily activated by the reception of a new ECM message for the currently requested channel. For example, in another embodiment, a request for updating the table 79 is automatically sent to the server 106 by the terminal immediately upon expiry of the duration of validity of the control words contained in this table for one or more channels, even if the channels are not currently descrambled. The sending of a request for updating the table 79 can also be activated as soon as the number of control words for which the duration of validity has expired exceeds a predetermined threshold. Preferably, this threshold is expressed as a percentage of a total number of control words contained in the table 79. Preferably, these requests for updating the table 79 are smoothened in time so as not to prompt load peaks on the server 106.

As a variant, the deciphering of each cryptogram $CW^*_{i,t}$ contained in an ECM message transmitted to the server 106 is done solely if the access rights contained in this same ECM correspond to the access entitlements of the user who has sent this ECM.

Other method for smoothing the sending, in time, of the requests to the server 108 can be used. These other methods do not necessarily have recourse to the drawing of a random number.

In another variant, the updating of the table 79 is limited solely to the recordings whose duration of validity has expired or is on the point of expiry. To this end, each request transmitted by a terminal to the server 106 also contains an image of the control words currently contained in the table 79. For example, this image is constituted by the identifier i of the channel associated with the order number $N_{ECMi}$ in the table 79. Thus, the server 106 identifies only the recording or recordings for which an updating is necessary and transmits only these recordings during the step 162. This limits the bandwidth needed to send local tables through the server 106.

Approaches other than the use of a secured tunnel to protect the transmission of the control words between a terminal and the server 106 are possible. For example, each pair of control words is enciphered by the server 106 with a private key K1 known only to the terminal to which this pair of control words must be transmitted.

The control word table transmitted to the terminal then contains only the cryptograms $E_{K1}(CW_{i,t})$ thus obtained. The other pieces of information of the local table can be nonenciphered. Consequently, the pairs of control words stored in the terminal are stored solely in enciphered form. The deciphering of these pairs of control words takes place only when the descrambling of the corresponding channel is activated. This increases security.

There are other approaches to securing the transmission of the control words from the server 106 to the terminals. For example, the device 6 carries out a first encipherment of the control words in plain form with a key K1 and then a second encipherment with a key K2. The ECM messages then contain the cryptogram $E_{K2K1}(CW_{i,t})$ instead of the cryptogram $CW^*_{i,t}$. In response to a request from a terminal, the server 106 deciphers the cryptogram $E_{K2K1}(CW_{i,t})$ for a first time with the key K2 to obtain the control word $E_{K1}(CW_{i,t})$. This control word $E_{K1}(CW_{i,t})$ is transmitted in response to the terminal. The control word $E_{K1}(CW_{i,t})$ enables the descrambling of the multimedia content after it has been deciphered a second time by the terminal with the key K1.

The smoothening of the load peaks is all the more efficient as the duration of the cryptoperiods is long. However, instead of lengthening the duration of a cryptoperiod, it is also possible to re-use the same control word in several successive cryptoperiods. Indeed, this makes it possible to distribute the requests sent to the control-word server over a lengthier duration. However, this method has the advantage of enabling a comparison of the access rights with the access entitlement of the user during each cryptoperiod.

An identifier of the terminal can be used in place of the user identifier.

The characteristics of the methods of FIGS. 3 and 4 can be combined.

The invention claimed is:

1. A method for deciphering control words for a first terminal and at least one second terminal, said first terminal and said at least one second terminal being mechanically and electronically independent of one another, said method comprising causing said first terminal to transmit a first cryptogram to a control-word server, causing said at least one second terminal to transmit a second cryptogram to said control-word server, causing said control-word server to decipher said first cryptogram to obtain a first control word for enabling descrambling of first multimedia content broadcast on a first channel, causing said control-word server to decipher said second cryptogram to obtain a second control word for enabling descrambling of second multimedia content broadcast on a second channel simultaneously with said first multimedia content, causing said control-word server to transmit said first control word to said first terminal, causing said control-word server to transmit said second control word to said at least one second terminal, causing said control-word server to also transmit said second control word to said first terminal, said second control word being obtained by deciphering said second cryptogram transmitted by said second terminal before said first terminal executes a channel change by changing descrambled channels in passing from said first channel to said second channel, and in response to said channel change, causing said first terminal to execute a search to determine whether said second control word has already been transmitted in advance by said control-word server before said channel change, and if said control word has been transmitted in advance, causing said first terminal to immediately start descrambling said second multimedia content broadcast on said second channel with said second control word, said second control word having been transmitted in advance.

2. A method of transmitting a first control word to a first terminal and a second control word to a second terminal, wherein said second terminal is mechanically independent of said first terminal, wherein said first terminal is electronically independent of said second terminal, wherein said first terminal has been caused to transmit a first cryptogram to a control-word server, and wherein a second terminal has been caused to transmit a second cryptogram to said control-word server, said method comprising, in response to transmission of first and second cryptograms to said control-word server by said first and second terminals respectively, causing said control-word server to decipher said first cryptogram to obtain a first control word and causing said control-word server to decipher said second cryptogram to obtain a second control word, said first control word enabling descrambling of first multimedia content and said second control word enabling descrambling of second multimedia content, wherein said first multi-media content and said second multi-media content are broadcast simultaneously on said first and second channels respectively, causing said control-word server to transmit said first control word to said first terminal, causing said control-word server to transmit said second control word to said second terminal, causing said control-word server to transmit, to said first terminal, said second control word, said second control word having being obtained by deciphering said second cryptogram transmitted by said second terminal before said first terminal changes descrambled channels in passing from said first channel to said second channel.

3. The method of claim 2, wherein in response to transmission of a third cryptogram to said control-word server by a third terminal that is mechanically and electronically independent of said first and second terminals, causing said control-word server to decipher said third cryptogram to obtain a third control word that enables descrambling of third multimedia content broadcast that is being broadcast on a third channel simultaneously with broadcasting of said first and second multimedia content on said first and second channels, and causing said control-word server to select said second control word but not said third control word from a table containing at least said second and third control words and to transmit only control words selected from said table at said first terminal.

4. The method of claim 3, further comprising causing said control-word server to build an index for each channel associated with control words contained in said table, said index representing a probability that said channel will soon be descrambled by said first terminal, and to select, from said table, one or more control words to be transmitted to said first terminal as a function of said index.

5. The method of claim 4, wherein building an index for each channel comprises building an index of said second channel from counting transmissions of said second cryptogram by other terminals that are mechanically and electronically independent of said second terminal.

6. The method of claim 2, further comprising causing said control-word server to transmit each control word associated with an identifier of one or more crypto-periods that said control word serves to descramble.

7. A method for receiving first and second control words by a first terminal, said method comprising causing said first terminal to send a first cryptogram to a control-word server and to receive in response a first control word deciphered by said control-word server, said first control word being usable to descramble multimedia content broadcast on a first channel received by said first terminal, causing said first terminal to receive a second control word to descramble second multimedia content that is broadcast on a second channel, said first and second multimedia content being broadcast simultaneously on said first and second channels, wherein said second control word is obtained solely by deciphering a second cryptogram by said control-word server, causing said first terminal to change descrambled channels by passing from said first channel to said second channel, wherein said first terminal receives said second control word before said first terminal changes channels without having preliminarily transmitted said second cryptogram to said control-word server, and wherein in response to said channel change, said first terminal executes a search to see if said second control word has already been transmitted in advance by said control-word server before said channel change, wherein said first terminal begins descrambling said multimedia content broadcast on said second channel with said second control word that was transmitted in advance of said channel change.

8. The method of claim 7, wherein said first terminal descrambles a first crypto-period of said first multimedia content broadcast on said first channel with said first control word and delays transmission of a cryptogram to descramble a second crypto-period of said multimedia content broadcast on said first channel by a determined period of time to spread out, at least throughout a duration of said first crypto-period, instants of transmission of cryptograms coming from different terminals that are mechanically and electrically independent of one another.

9. The method of claim 7, wherein, if said second control word has not been transmitted before said first terminal changes channels, said first terminal immediately transmits said second cryptogram to said control-word server and then waits until receiving said second control word from said control-word server before starting to descramble said multimedia content broadcast on said second channel.

10. The method of claim 7, wherein said first terminal stores only said second control word as a cryptogram obtained by enciphering said second control word with a secret key, said secret key being known only to said first terminal and being unknown to other terminals.

11. A tangible and non-transitory information-recording medium having encoded thereon instructions that, when executed by a computing system, cause execution of said method recited in claim 7.

12. The method of claim 7, wherein said second control word is obtained solely by deciphering a second cryptogram that was received by said control-server from a second terminal, subsequently deciphered by said control-word server, and sent to said first terminal by said control-word server.

13. A tangible and non-transitory information-recording medium having encoded thereon instructions that, when executed by a computing system, cause execution of said method recited in claim 2.

14. An apparatus comprising a control-word server for transmission of a first control word to a first terminal and a second control word to a second terminal, wherein said first terminal and said second terminal are mechanically and electronically independent of each other, wherein said control-word server is configured to respond to transmission of first and second cryptograms by said first and second terminals respectively by deciphering said first cryptogram to obtain a first control word that enables descrambling of said first multimedia content broadcast on said first channel and deciphering said second cryptogram to obtain a second control word that enables descrambling of said second multimedia content broadcast on said second channel, wherein said first multimedia content and said second multimedia content are broadcast simultaneously, to transmit said first control word to said first terminal, to transmit said second control word to said second terminal, and to transmit to said first terminal, said second control word obtained by deciphering said second cryptogram transmitted by said second terminal even before said first terminal changes descrambled channels in passing from said first channel to said second channel.

* * * * *